United States Patent Office 3,335,716
Patented Aug. 15, 1967

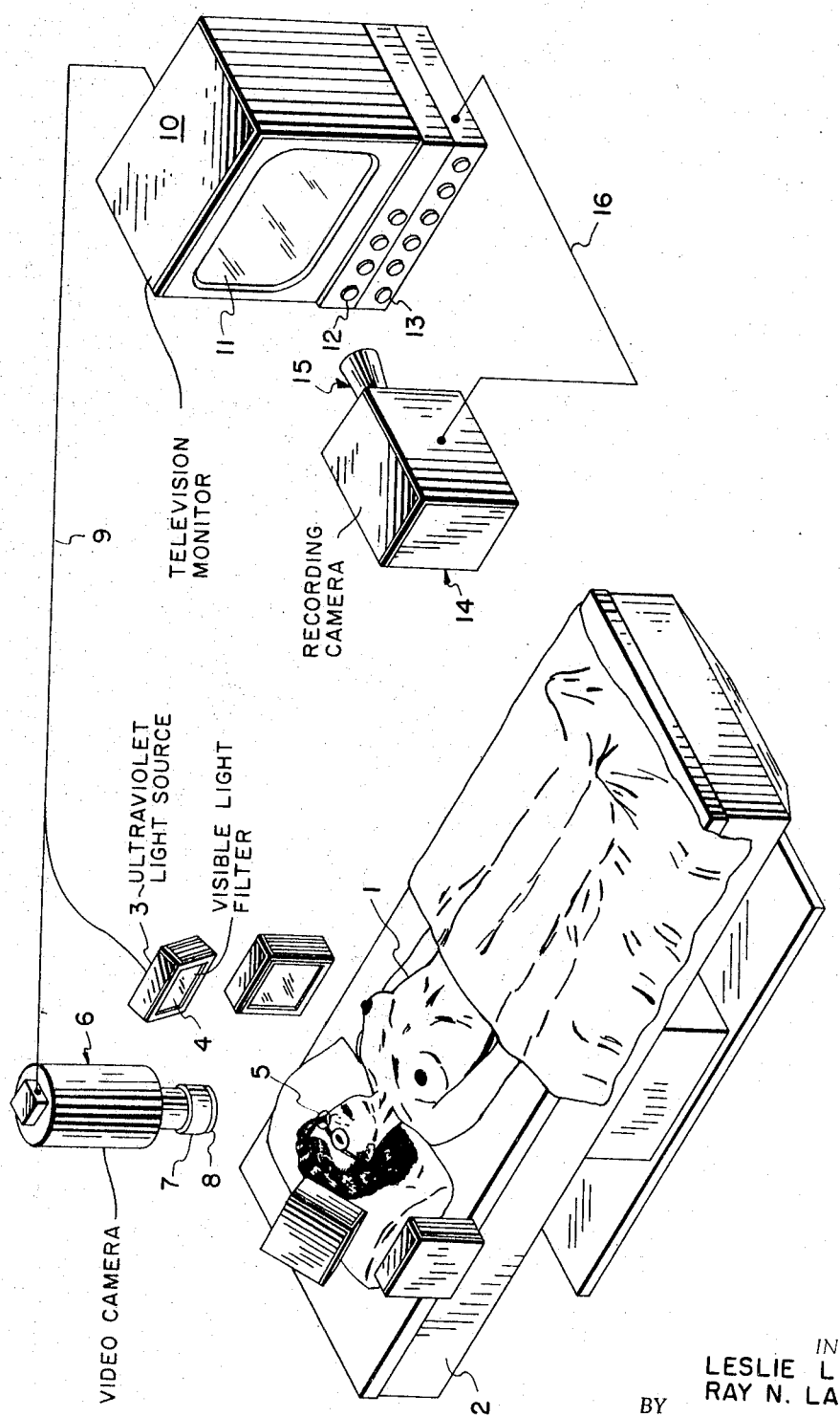

3,335,716
DIAGNOSTIC THERMOGRAPHY METHOD AND MEANS
Leslie L. Alt, Milwaukee, Wis., and Ray N. Lawson, Montreal, Quebec, Canada, assignors to General Electric Company, a corporation of New York
Filed Jan. 18, 1965, Ser. No. 426,342
11 Claims. (Cl. 128—2)

ABSTRACT OF THE DISCLOSURE

The human body is partly coated with a phosphor which, when excited to luminescence with ultraviolet radiation, glows with a brightness that is inversely related to the temperature gradient of the underlying tissue. A video camera displays the thermal pattern on a television picture tube to enable a diagnostician to accentuate small temperature differences by adjusting picture contrast. Consecutive images of the body in natural and ultraviolet light may be photographed from the picture tube and the photographs superimposed to locate thermally interesting areas accurately.

---

This invention relates to medical thermography and, in particular, to improvements in the thermographic method that is described in the copending application of Leslie L. Alt, Ser. No. 422,738, filed Dec. 31, 1964, and entitled, Diagnostic Thermographic Method and Means.

The cited application describes a procedure for obtaining diagnostic information about the human body by converting its skin surface thermal distribution pattern to a light image which may be interpreted by a diagnostician.

As explained in the copending application, there are temperature differences on the skin of the human body which may be correlated with the physiological state of the underlying tissue. Ordinarily, there is temperature symmetry between corresponding zones on opposite sides of the body. By determining the thermal pattern of a zone, it is possible to identify localized normal and pathological conditions, that manifest temperature differences by comparison with a corresponding opposite zone or by observation of temperature gradients within the zone.

The temperature differences observed on various surface zones of the human body may be attributed to several factors, such as differences in metabolic rates of dissimilar tissues, differences in thermal characteristics of various tissue, and differences in blood vessel distribution. For example, it has been discovered that venous blood has a higher temperature than arterial blood, which may be caused by heat being absorbed from a metabolically active area by the departing venous blood. The condition of a tissue may also influence the temperature gradient at the surface of the skin. Normal tissue exhibits certain temperature differences in itself and with respect to its incoming and outgoing blood. Inflamed tissue may have a comparatively greater blood supply and a warmer condition. Certain malignant tumors have still greater blood flow, higher metabolism, and thus manifest a correspondingly high temperature. Tumor temperatures also vary from one part of the neoplasm to another, usually being warmer at the edges, since their central regions are often necrotic. There are other examples of temperature distribution patterns that may indicate the subsurface presence of a malignant tumor or merely the presence of a benign inflammation, lesion, or a cyst. For the moment, it is sufficient to note that significant temperature differences in different zones on the human body surface may lie within a range of 1.5 to 3° C.

Currently used thermographic devices for medical diagnostic purposes are essentially scanning radiometers. The body is scanned mechanically with a suitable optical system, and infrared radiation detectors are employed that are either thermistor bolometers or semiconductor photon detectors. Sensed temperature variations on the body surface are converted by the detector to an electric signal which is used to modulate the intensity of a sharply focused light beam that is scanned synchronously over a recording medium. Recording may be done with a Polaroid camera which forms a positive image or with an ordinary camera which produces a film negative. Differences in the optical density of the line-by-line photographic record are proportional to the temperature differences in the surface studied. With this method there is no direct visualization of the body thermal pattern, but one must wait for the scanning process to be completed, which may take from 1 to 5 minutes, and for the film to be developed.

Among the reasons for current interest in thermography is the prospect of this technic being developed to the state where it is suitable for making mass surveys of the female population for signs of breast cancer. At the present time, the earliest indication of the existence of a possible pathological condition is the discovery of a lump, or an area of increased density, in the breast by palpation. If the lump is cancer, more often than not, it has spread by the time it is palpable or first diagnosed. On the other hand, not all cases of increased density are cancerous. Many are non-malignant cysts and fibrotic growths which may have a lower metabolic rate than certain malignancies, and hence, they are cooler than the latter. A sensitive thermographic system will assist in making the distinction.

The above outlined and other prior art apparatus has been found unsuitable for mass surveys because of the slowness of the methods, the poor resolution of thermal differences, and the lack of immediate visualization of the converted thermal image. A significant advance was made in overcoming these and other problems in the above cited patent application of Leslie L. Alt. That application disclosed a thermographic method wherein the skin surface of the part of the body under examination is coated with a thermally sensitive luminescent phosphor. The phosphor is a type that fluoresces in inverse proportion to underlying temperature when excited with radiation such as ultraviolet light. The phosphor luminesces less, and thus exhibits darker shades, in those zones in which the temperature of the underlying skin and tissue is higher. The surface manifestations of thermal phenomena may be correlated with metabolic conditions in deeper underlying tissue. With this method it is possible for the clinician to visualize a full-size thermal pattern directly, make an immediate diagnosis, and record the image on a suitable medium such as a film if desired. The new body contact phosphor technique has by itself increased the amount of information available to the diagnostician because of its sensitivity and its ability to resolve small temperature differences and make them visually and contrastingly perceptible.

It is apparent from the foregoing that the amount of information obtainable from the converted thermal image depends in part on the ability of the human eye or recording medium to perceive and to record contrast differences. The present invention is concerned with augmenting that perception by employing electronic means and it is among the particular objects of this invention to employ a closed circuit television system for this purpose.

In general terms, the new method is characterized by viewing the visible converted thermal pattern that is produced by the phosphor on the patient with a video camera and displaying the picture on the picture tube of a television monitor which has brightness and contrast controls, among others. By adjustment of these controls, otherwise imperceptible contrasts can be intensified and more readily discerned by the human eye. In addition, the camera is equipped with a zoom lens or other suitable optical system for enabling selection of a body area and presenting it in magnified form on the monitor screen. This further improves resolution and permits viewing on a scale that is even greater than life size. The system may also include a camera for recording on film the scenes that appear on the screen of the picture tube in the television monitor.

With prior art apparatus that measures infrared radiation from the body directly, it is necessary to chop the infrared radiation so an A-C signal will be produced from the detector to afford easier amplification. This results in information being lost during the time the chopper is in the beam since the scanner moves continuously. With the new system, however, there is no such loss of information because the scanning electron beam in the video camera passes uninterruptedly over each bit of visibly converted thermal information. Thus, an object of the instant invention is to provide a system that displays the information in correspondence with actual thermal gradations rather than in the discrete temperature steps of the prior art.

Another feature of the invention is that it enables presentation on the monitor of a view of the patient taken under ordinary lighting conditions. This view may be photographed from the face of the television picture tube in the monitor. A thermographic image may be then presented on the monitor and photographed. The thermographic negative may be superimposed directly or by optical means on the ordinary photograph and the pathological condition evidenced by the thermal difference can be located precisely on a picture of the body. The superimposed negatives may be printed together on photographic paper and the print used as a guide to the surgeon, if surgery is indicated.

Before proceeding with a detailed description, it may be noted that it is a general object of this invention to provide an improved method and means for conducting thermographic studies of the body.

Other specific objects are to reduce the time for making a thermographic study, to improve the sensitivity of thermographic methods, to enable resolving thermographs into precise thermal configurations rather than the blurred renditions produced by optical scanners, to facilitate immediate remote viewing and interpretation of thermal information, and to avoid the need for immobilizing the patient during the course of a study as was necessary with prior art scanning methods.

An illustrative embodiment of the invention will now be described more fully in conjunction with the drawing which in its single figure shows a general view of the arrangement of the patient and the equipment for conducting a thermographic study in accordance with the invention.

In the drawing, the patient 1 is supine on a table 2 that is preferably tiltable lengthwise like a diagnostic X-ray table. For illustrative purposes it may be assumed that the chest area to be examined has been coated with a luminescent phosphor material as described above. Arranged over the patient, with their hangers omitted, are several sources 3 of exciting radiation. The front of each source may be a glass filter 4 which preferably removes most of the visible light and transmits only the part of the spectrum that is most effective to excite the particular phosphor employed to luminescence. In a practical case, commercially available "black light" sources were used because they produce a narrow band of exciting radiation at the long wave length end of the ultraviolet spectrum, which radiation is an efficient exciter of the zinc-cadmium sulfide phosphor with silver and nickel doping agents that were used. The long wave length ultraviolet radiation is also preferred because it does not cause erythema or patient discomfort. The patient is, nevertheless, equipped with a pair of orange glasses 5 to ease accommodation to room light changes, and to avoid any discomfort that might be caused by the inside of the eyes fluorescing due to ultraviolet excitation. The "black light" sources 3 have light intensity controls or dimmers which are not shown.

After the patient area of interest is coated uniformly with a phosphor by one of the methods described in the above cited patent application, the room lights are dimmed or extinguished and the "black light" sources 3 are energized. Under these circumstances, the phosphor fluoresces and those zones having higher underlying skin temperatures appear relatively dimmer in shades that correspond with temperature gradients. For instance, the blood vessel pattern and tissues of different densities and metabolic activity may be visualized, so that a thermal pattern is converted into a visual image. The clinician may then make immediate diagnostic inferences from direct observation of the converted thermal configurations or he may elect to photograph the image.

According to the present invention, however, the converted thermal image is viewed with a video camera 6. This camera may be equipped with a zoom lens 7 that has a filter 8 in its optical path. The filter is selected to transmit that part of the visible spectrum which is emitted by the phosphor and to attenuate ultraviolet and other light that might be reflected by the surroundings. Since zinc-cadmium sulfide phosphor emits greenish-yellow light primarily, a yellow or orange filter 8 has been found satisfactory for eliminating interfering radiation from the video camera 6 when that phosphor is used.

The zoom lens 7 may be any commercially available type that allows concentrating on a desired area. The type used in a practical case permitted magnifications of 3 or 4 times on the picture tube of a television monitor without loss of sharpness. Video camera 6 is connected by means of a cable 9 to the television monitor 10, which in actual practice displayed an 875 line picture on the phosphorescent screen of a television picture tube 11. The monitor serves as a viewing station and may be located in a console from which various control functions may be carried out as will be described below.

On the monitor 10 is a row of switch knobs for controlling the video circuits and the character of the picture. The knobs are designated collectively by the numeral 12. One knob in this row may be an on-off switch and another pair may be for picture brightness and contrast controls, respectively. The circuitry of these controls is essentially conventional. There is also in the upper row a fourth knob which may be operated to make the picture appear either as a positive or a negative image on the television picture tube 11. This kind of control is known to those who are knowledgeable in the television art, so its electrical characteristics will not be discussed. Suffice it to say that the positive-to-negative inverting switch may take effect by phase shifting in video camera 6 by way of conductors in cable 9 or by phase shifting in the monitor.

A lower row of control knobs 13 is also provided on the monitor console 10. As many of these knobs as there are "black light" sources 3 may be devoted to dimming or remotely controlling the intensity of the sources. Another knob may be for controlling a motor in the video camera 6, which motor operates the zoom lens in and out to take in a greater or smaller area of the body. Other knobs may be assigned to controlling motor driven mechanical drives for positioning the "black light" sources and the video camera with respect to the patient. Thus, it is seen that the diagnostician may control the entire procedure from a single console station. A recording camera 14 may be used to record converted thermographic images at the desired moment that they appear on the television picture tube 11. Camera 14 may be of the cine or regular type. In an actual case, a reflex camera with a rapid sequence electric film advance mechanism was used. In order to eliminate the effect of scattered ultraviolet light, the picture tube 11 of the monitor is photographed through a suitable filter in the front end of lens assembly 15 in camera 14. In a system that employs zinc-cadmium sulfide phosphor, an orange filter is used. Camera 14 may be connected with a cable 16 to receive its operating electric power from the console and to permit joint control with the video camera 6, light sources 3, and another set of lights which may be room lights, not shown. This facilitates the technique mentioned above wherein the patient is viewed by video camera 6 under ordinary light so that a normal visible image appears on the screen. The contrast and brightness controls are adjusted until the picture is ready for photographing. Then camera 14 actually takes the two different kinds of pictures that appear on screen 11. The sequentially obtained film negatives may, after development, be superimposed to locate the thermal image with respect to that part of the anatomy which is under study. The details of the control circuitry, the relays and the like for accomplishing the above method have not been shown because they can be devised by a skilled technician with proper instructions about the novel ends that are desired to be achieved.

Control of the image contrast and brightness on the television picture tube screen 11 yields another unobvious advantage. By this means it is possible to attenuate the thermal information in the image so as to obscure that information which might tend to confuse interpretation. For example, by reducing brightness, relatively cool zones like those demarking certain blood vessels may be de-emphasized and the hotter regions, such as may be due to certain malignancies, may be retained and be made more contrasting with the aid of the contrast control.

Because the above described system permits immediate study of a life size visible image on a television picture tube screen, it is a valuable instrumentality for research as well as diagnostic studies. One example is where a patient is being treated with chemotherapy for a malignancy or other ailment in which case a drug may be administered. The effects of a drug appear sooner as thermal changes in the site in which it is destined to have an effect, than in more generalized ways that have served as traditional criteria of effectiveness. Even the spreading effect of metabolism inhibiting drugs may be seen. The new technique lends itself to making repeated studies under reproducible conditions so that regression, arrest, or progression of certain malignancies may be re-examined on occasion. These types of rapid determinations are possible because the luminescence of the phosphor changes substantially instantaneously with very small temperature changes and the changes may be readily perceived because of the rapid response rate and overall sensitivity of the system.

The real temperature of any given zone may be determined by having a temperature reference scale within view of the video camera. The scale will then appear on the monitor screen along with the converted thermal image. One such scale is described in the cited co-pending application and its description will not be repeated, except to say that it includes a plurality of phosphor coated metal disks that have their temperatures controlled with thermocouples. The reference phosphors are excited by the same ultraviolet source as the coating on the patient. Zones in the converted thermal image on the television picture tube or on a recording thereof, may be compared visually or photometrically with the reference temperatures to obtain the real temperature within the image.

In summary, a system and method have been described for obtaining a complete thermal map of selected regions of the human body. The method lends itself to study of dynamic thermal conditions and diversifies diagnostic and research observations. Rapid and inexpensive thermographic surveys of the population may now be made with minimum patient discomfort and inconvenience. Thermal configurations are more precise and hence, more information can be derived than was possible heretofore.

Although an embodiment of the invention and several of its diagnostic capabilities have been described, such descriptions are to be considered illustrative rather than limiting, for the invention may be variously embodied and used and is to be limited only by interpretation of the claims which follow.

It is claimed:
1. A method of visualizing the thermal pattern on the surface of the human body comprising the steps of:
 (a) applying to the body surface a thin uniform coating of a phosphor which fluoresces differentially with the temperature of the underlying tissue when exposed to exciting radiation to convert the thermal pattern to a corresponding visible pattern,
 (b) projecting exciting radiation on the phosphor to effect the conversion,
 (c) viewing said converted thermal pattern with a video camera, and
 (d) displaying the visible thermal pattern viewed by the video camera on a television picture tube.

2. A method of visualizing the thermal pattern on the surface of the human body comprising the steps of:
 (a) applying to the surface of the body a thin uniform coating of a phosphor material that fluoresces differentially with temperature of the underlying tissue when exposed to exciting radiation to convert the thermal pattern to a corresponding visible pattern,
 (b) projecting exciting radiation on the phosphor to effect said conversion,
 (c) viewing said converted thermal pattern with a video camera,
 (d) displaying the visible thermal pattern viewed by the video camera on a television picture tube, and
 (e) controlling the contrast and brightness of the television picture tube to enhance visual perception of thermal configurations.

3. A method of obtaining physiological information about sub-surface conditions in the human body from its surface thermal pattern comprising the steps of:
 (a) applying to symmetrical areas of the body a thin uniform coating of a phosphor which fluoresces differentially with the temperature of the underlying tissue when exposed to exciting radiation to convert the thermal pattern to a corresponding visual pattern,
 (b) projecting exciting radiation on the phosphor to effect said conversion,
 (c) viewing the converted thermal pattern of both areas with a video camera,
 (d) displaying the thermal patterns of both areas as viewed by the video camera simultaneously on a television picture tube,
 (e) controlling the contrast and brightness of the television picture tube to enhance visual perception of thermal configurations of each area, and
 (f) comparing the thermal configurations in corresponding zones of each area to determine the presence or absence of abnormal conditions.

4. A method of visualizing the thermal pattern on the surface of the human body comprising the steps of:
 (a) applying to the body surface a thin uniform coating of a phosphor that fluoresces differentially with the temperature of the underlying tissue when exposed to exciting radiation to convert the thermal pattern to a corresponding visible pattern,
 (b) projecting exciting radiation on the phosphor to effect the conversion,
 (c) viewing said converted thermal pattern with a video camera that is focused on an area of predetermined size, and
 (d) displaying a magnified version of the pattern viewed by the video camera on the screen of a television picture tube whereby thermal configurations may be discerned more readily.

5. A method of visualizing the thermal pattern on the surface of the human body comprising the steps of:
   (a) applying to the surface of the body a thin uniform coating of a phosphor that fluoresces inversely with the temperature of the underlying tissue so as to exhibit dimmer configurations where the skin is warmer when the phosphor is exposed to exciting radiation,
   (b) projecting exciting radiation on the phosphor to convert the thermal pattern to a visual pattern,
   (c) viewing said converted thermal pattern with a video camera,
   (d) displaying the visible thermal pattern viewed by the video camera on the screen of a television picture tube in a television monitor, and
   (e) controlling the contrast and brightness of the picture on the screen so as to reduce background light and emphasize the dimmer zones until they are more perceptible than when directly visualized on the body.

6. A method of detecing breast cancer in humans by interpretation of the thermal pattern on the skin of the breast comprising the steps of:
   (a) applying to the breast a thin uniform coating of a phosphor which fluoresces differentially with the temperature of the underlying tissue when exposed to exciting radiation to convert the thermal pattern to a corresponding visible pattern,
   (b) projecting exciting radiation on the phosphor to effect the conversion,
   (c) viewing said converted thermal pattern with a video camera,
   (d) displaying the visible thermal pattern viewed by the video camera on a television picture tube, and
   (e) examining the visible thermal pattern for temperature configurations that may be related to abnormal metabolism in localized zones within the underlying tissue.

7. A thermography method for determining the status of metabolic activity in a zone under a surface area of the human body from the thermal pattern on the overlying skin comprising the steps of:
   (a) applying to the body surface area of interest a thin uniform coating of a phosphor which fluoresces differentially with the temperature of the underlying skin when exposed to exciting radiation to convert the thermal pattern to a corresponding visible pattern,
   (b) having two radiation sources for illuminating the body selectively with visible light and with radiation that excites the phosphor to effect the conversion,
   (c) viewing the body with a video camera,
   (d) displaying the body area viewed by the video camera on a television picture tube,
   (e) sequentially turning the radiation sources on and off to present on the tube alternate views of the body when in visible light and when in radiation that produces the converted thermal pattern,
   (f) photographing the respective views as they appear on the tube, and
   (g) superimposing the photographs to locate thermal configurations with respect to the body area.

8. In thermography apparatus that uses a phosphor coating on the human body to convert the surface thermal pattern thereof to a corresponding visible pattern when the phosphor is excited to luminescence with suitable radiation, the improvements in said apparatus which comprise:
   (a) a video camera that is positioned to view the body and adapted to convert the visible image to video signals, and
   (b) a television monitor including a television picture tube, said monitor being electrically connected with the video camera to reconvert the video signals to a visible pattern on the tube.

9. The invention set forth in claim 8 including:
   (a) an electrically powered source of exciting radiation that is near the body for exciting the phosphor coating to luminescence, and
   (b) a manually operable control device proximate with the television monitor and connected with the exciting radiation source for remotely controlling the intensity of the source.

10. The invention set forth in claim 8 including:
    (a) manually operable means associated with the television monitor to control the contrast and brightness of the visibly converted thermal pattern on the television tube.

11. The invention set forth in claim 8 including:
    (a) manually operable switch means associated with the television monitor and adapted to change a positive image pattern that is viewed by the video camera to a negative image pattern on the television picture tube.

References Cited
UNITED STATES PATENTS
| | | | |
|---|---|---|---|
| 2,744,521 | 5/1956 | Schmid | 128—2 |
| 3,245,402 | 4/1966 | Barnes | 128—2 |

RICHARD A. GAUDET, *Primary Examiner.*

SIMON BRODER, *Examiner.*